(No Model.)

B. F. BARNES.
BELT GEARING.

No. 354,849. Patented Dec. 21, 1886.

Witnesses.
S. A. H. Behel
A. O. Behel

Inventor.
Benjamin F. Barnes
Petr. Jacob Behel
Atty.

N. PETERS, Photo-Lithographer, Washington, D. C.

UNITED STATES PATENT OFFICE.

BENJAMIN F. BARNES, OF ROCKFORD, ILLINOIS, ASSIGNOR TO THE W. F. & JOHN BARNES COMPANY, OF SAME PLACE.

BELT-GEARING.

SPECIFICATION forming part of Letters Patent No. 354,849, dated December 21, 1886.

Application filed March 2, 1886. Serial No. 193,789. (No model.)

*To all whom it may concern:*

Be it known that I, BENJAMIN F. BARNES, a citizen of the United States, residing in the city of Rockford, in the county of Winnebago and State of Illinois, have invented a new and useful Improvement in Belt-Gearing, of which the following is a specification.

This invention relates to belt-gearing employed to impart motion to machinery. Its object is to reduce the belt-tension, lessen the friction of the journal-bearings and increase the driving force of the belt.

In belt-gearing as heretofore employed, in many situations and under certain circumstances, large pulleys are required to impart motion to small pulleys in close proximity to the periphery of the large pulley. Under such circumstances the belt upon the large pulley embraces a large portion of its periphery, which gives it great adhesive force or power, and it necessarily embraces but a small portion of the small or driven pulley. Under such circumstances, under rapid movements, the momentum of the belt will tend to carry it from the periphery of the small pulley in its abrupt curve or change of direction and to lessen its adhesive force or frictional contact with the pulley, and to impart any considerable force to the small pulley great tension of belt is required, which operates to greatly increase the friction of the bearings, and consequently require a greater amount of power to accomplish a given amount of work. To obviate this difficulty and produce a more efficient belt-gearing, I have designed and constructed my improved belt-gearing, consisting, essentially, in the combination of a smooth-faced pulley and a sprocket-toothed pulley of less diameter than the smooth-faced pulley, and a perforated belt connecting said pulleys, as represented in the accompanying drawings, in which—

Figure 1:
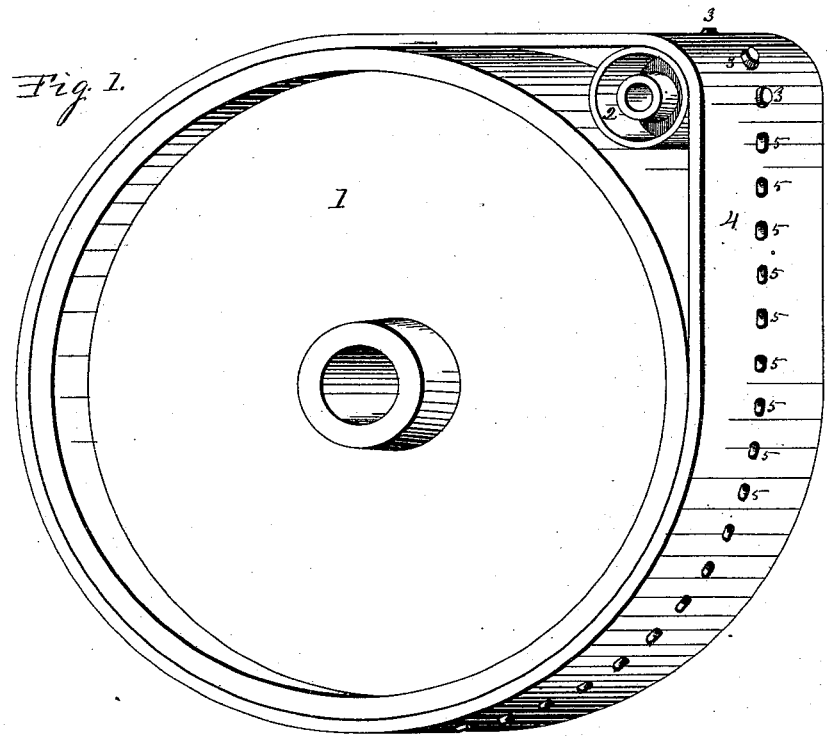
Figure 2:
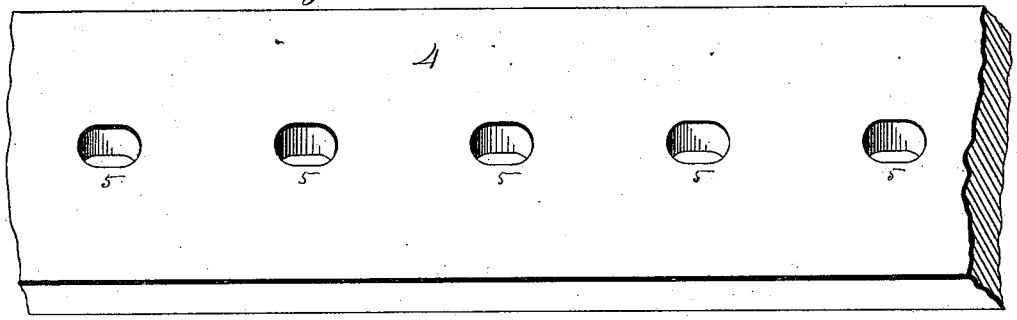
Figure 3:
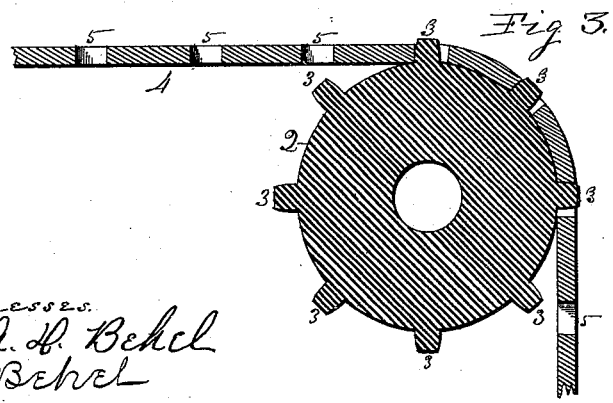

Figure 1 is an isometrical representation of an apparatus embodying my invention. Fig. 2 is an isometrical representation of the belt employed. Fig. 3 is a central section of the sprocket-toothed pulley and perforated belt.

In the figures, 1 represents a smooth-faced pulley of the usual construction.

2 represents a pulley, which as such may be any of the known forms, produced from any suitable material. The face of this pulley is provided at proper equal intervals with stud-formed sprocket-teeth 3, projecting a proper distance from the face of the pulley to enter the openings in the belt.

A belt (represented at 4) is provided centrally at proper equal intervals with openings 5, to receive the sprocket-teeth of the pulley. The openings 5 formed in the belt are of a width to receive the sprocket-teeth snugly, and their length is such as to freely receive the teeth. I therefore prefer to produce the openings in the belt of oblong form, having a diameter in the lengthwise direction of the belt greater than their diameter in the transverse direction thereof.

In the use of my improved belt-gearing it will only require that the smaller pulley be produced in sprocket-tooth form, by which arrangement the driving force of the belt will be substantially equal both on the large and small pulleys; and to obtain equal results with the system of unsprocketed pulleys and belting less tension of belt will be required, and consequently there will be less friction on the journal-bearing of the shafting and less tendency to spring the shafting out of line.

I claim as my invention—

The combination, in a belt-gear train, of an untoothed pulley and a toothed pulley of less diameter than the untoothed pulley, and a perforated belt adapted to receive the teeth of the smaller pulley, substantially as described.

BENJAMIN F. BARNES.

Witnesses:
 FRANK E. HUMESTON.
 A. O. BEHEL.